United States Patent
Kloos et al.

(10) Patent No.: US 7,493,887 B2
(45) Date of Patent: Feb. 24, 2009

(54) METHOD FOR DETECTING PREINJECTION

(75) Inventors: Albert Kloos, Friedrichshafen (DE); Andreas Kunz, Friedrichshafen (DE); Günther Schmidt, Friedrichshafen (DE); Ralf Speetzen, Friedrichshafen (DE); Michael Willmann, Bermatingen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 11/881,015

(22) Filed: Jul. 25, 2007

(65) Prior Publication Data

US 2008/0027625 A1 Jan. 31, 2008

(30) Foreign Application Priority Data

Jul. 26, 2006 (DE) .................. 10 2006 034 513

(51) Int. Cl.
*F02B 5/00* (2006.01)
*F02M 1/00* (2006.01)

(52) U.S. Cl. .................. 123/305; 123/447; 123/456; 123/457

(58) Field of Classification Search .................. 123/294, 123/297, 305, 429, 445, 446, 447, 546, 547, 123/478, 479, 501; 701/103
See application file for complete search history.

(56) References Cited

U.S. PATENT DOCUMENTS 6,510,692 B2 * 1/2003 Shirakawa ............... 60/602
6,612,292 B2 * 9/2003 Shirakawa ............... 123/501
6,658,847 B2 * 12/2003 Shirakawa ............... 60/602
6,722,345 B2 * 4/2004 Saeki et al. ............... 123/435
2003/0089332 A1 5/2003 Yomogida
2006/0157035 A1 7/2006 Speetzen et al.
2006/0266332 A1 11/2006 Kloos et al.

FOREIGN PATENT DOCUMENTS

DE        103 44 181       4/2005
DE    10 2004 006 896      9/2005
EP          0 570 986     11/1993

\* cited by examiner

*Primary Examiner*—John T Kwon
(74) *Attorney, Agent, or Firm*—Klaus P. Stoffel; Wolff & Samson PC

(57) ABSTRACT

A method for detecting a preinjection in an internal combustion engine with a common-rail system, including individual accumulators, in which an individual accumulator pressure distribution is detected in a measurement interval and is used to determine an injection end of the main injection, in which a virtual injection start of the main injection is computed by a mathematical function as a function of the injection end, and in which the virtual injection start is set as the actual injection start of the main injection. With the preinjection activated, an actual injection delay for the main injection is determined as a function of the actual injection start, an injection delay deviation of a set injection delay from the actual injection delay is computed, and the injection delay deviation is used to determine whether a preinjection has occurred.

13 Claims, 4 Drawing Sheets

METHOD FOR DETECTING PREINJECTION

BACKGROUND OF THE INVENTION

The invention relates to a method for detecting a preinjection in an internal combustion engine with a common-rail system, including individual accumulators.

In an internal combustion engine, the quality of combustion and the composition of the exhaust gas are critically determined by the start of injection and the end of injection. In order to stay within legally prescribed limits, these two characteristics are usually automatically controlled by an electronic engine control unit. Another measure consists in preinjection, which reduces the rate of pressure rise in the cylinder and thus the mechanical loading of the components.

DE 103 44 181 A1 discloses a control method for an internal combustion engine with a common-rail system, including individual accumulators, in which the individual accumulator pressure distribution is detected and used to determine an injection end. On the basis of the injection end, a virtual injection start is then computed by a mathematical function. The virtual injection start is then set as the actual injection start for the continuing operation of the internal combustion engine. The cited document provides no information about a preinjection.

SUMMARY OF THE INVENTION

The object of the present invention is further development of the previously described method with respect to more reliable detection of a preinjection in an internal combustion engine with a common-rail system, including individual accumulators.

Pursuant to this object, and others which will become apparent hereafter, one aspect of the present invention resides in a method for detecting a preinjection in an internal combustion engine with a common-rail system, including individual accumulators. The method includes the steps of: detecting an individual accumulator pressure distribution (pE) in a measurement interval and using the individual accumulator pressure distribution to determine an injection end (SE) of a main injection; computing a virtual injection start (SBv) of the main injection by a mathematical function as a function of the injection end (SE); setting the virtual injection start (SBv) as an actual injection start (SB(IST)) of the main injection; determining, with preinjection activated, an actual injection delay (SV(IST)) for the main injection as a function of the actual injection start (SB(IST)); computing an injection delay deviation (dSV) of a set injection delay (SV(SL)) from the actual injection delay (SV(IST)); and using the injection delay deviation (dSV) to determine whether a preinjection (VE) has occurred.

Another aspect resides in a method including the steps of: detecting an individual accumulator pressure distribution (pE) in a first measurement interval and using the individual accumulator pressure distribution to determine a first injection end (SE1) of a main injection; computing a first virtual injection start (SBv1) of the main injection as a function of the first injection end (SE1) by means of a mathematical function; setting the first virtual injection start (SBv1) as a first actual injection start (SB1(IST)) of the main injection; deactivating the preinjection; detecting the individual accumulator pressure distribution (pE) in a second measurement interval and using the individual accumulator pressure distribution to determine a second injection end (SE2) of the main injection; computing a second virtual injection start (SBv2) of the main injection as a function of the second injection end (SE2) by means of a mathematical function; setting the second virtual injection start (SBv2) as a second actual injection start (SB2(IST)) of the main injection; computing an actual injection start deviation (dSB(IST)) from the first actual injection start (SB1(IST)) to the second actual injection start (SB2(IST)); and using the actual injection start deviation (dSB(IST)) to determine whether a preinjection (VE) has occurred.

Both solutions are based on the recognition that a preinjection has an effect on the start of the main injection, since the state of the injector at the start of the main injection depends on whether a preinjection has occurred. The focus of the first embodiment is the injection delay of the main injection, while the focus of the second embodiment is the difference in the injection start in the case of a main injection with activated preinjection and in the case of a main injection with deactivated preinjection. The injection delay is the time difference (lag time) from the output of the energization start to the injector by the electronic engine control unit to the actual injection start.

Specifically, in accordance with the first embodiment, with the preinjection activated, an actual injection delay for the main injection is determined as a function of the actual injection start, and an injection delay deviation of a set injection delay from the actual injection delay is computed. The injection delay deviation is then used to determine whether a preinjection has occurred. A preinjection has occurred if the injection delay deviation falls within a tolerance range, or a preinjection has not occurred if the injection delay deviation falls outside the tolerance range. The set injection delay is determined by an input-output map as a function of a rail pressure and an engine speed.

In accordance with the second embodiment, after an actual injection start for a main injection has been determined with the preinjection activated, the preinjection is deactivated. The individual accumulator pressure distribution is then detected in a second measurement interval and used to determine a second injection end of the main injection. A second virtual injection start of the main injection is then computed as a function of the second injection end by means of a mathematical function, and the second virtual injection start is set as the second actual injection start of the main injection. An actual injection start deviation from the first actual injection start to the second actual injection start is then computed. The actual injection start deviation is used to determine whether a preinjection has occurred. A preinjection has occurred if the actual injection start deviation falls within a tolerance range, or a preinjection has not occurred if the actual injection start deviation falls outside the tolerance range.

A common feature of both embodiments is that when it has been detected that a preinjection has not occurred, the energization duration of the preinjection is increased in increments, starting from an initial value, until a preinjection has occurred. For safety reasons, the energization duration of the preinjection is increased only up to a maximum value. If at that point a preinjection still has not occurred, the start of energization of the main injection is preferably shifted towards late.

Both embodiments also have in common that when it has been detected that a preinjection has occurred, the energization start of the main injection is adjusted.

The embodiments in accordance with the invention are reliable methods, since the behavior of the main injection is analyzed and not the preinjection itself. As is well known, the analysis of the preinjection on the basis of the signal-to-noise ratio and the signal duration is subject to large error.

The invention can be used during the operation of the internal combustion engine, since the response of the internal combustion engine is clearly detected. In addition, targeted, cylinder-specific injector diagnosis is possible, which results in increased service life of an injector. The invention can be applied later as a pure software solution.

Other features and advantages of the present invention will become apparent from the following description of the invention that refers to the accompanying drawings.

DETAILED DESCRIPTION OF THE INVENTION

Figure 1:
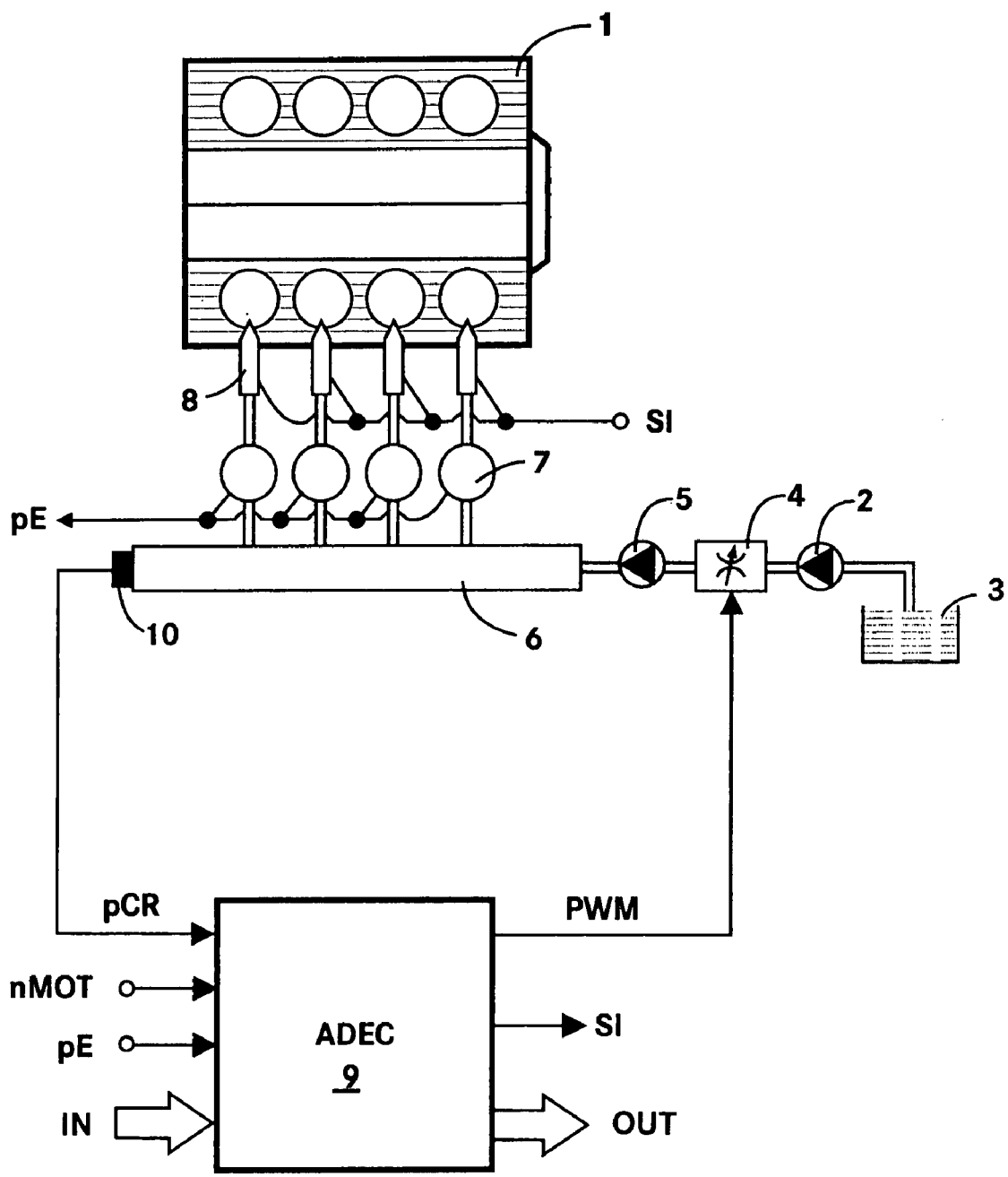
FIG. 1 shows a system diagram.

FIG. 1 shows a system diagram of an electronically controlled internal combustion engine 1, in which the fuel is injected by a common-rail injection system. This injection system comprises the following components: a low-pressure pump 2 for delivering fuel from a fuel tank 3, a suction throttle 4 for establishing a volume flow, a high-pressure pump 5 for pumping the fuel at increased pressure into a rail 6, individual accumulators 7 for temporary storage of the fuel, and injectors 8 for injecting the fuel into the combustion chambers of the internal combustion engine 1.

The common-rail system with individual accumulators 7 differs from a conventional common-rail system in that the fuel to be injected is taken from the individual accumulator 7; the energy for an injection is derived from the fuel volume elasticity of the fuel in the individual accumulator. The feed line from the rail 6 to the individual accumulator 7 is designed in such a way in practice that feedback of interfering frequencies into the rail 6 is damped. During the injection pause, just enough fuel continues to flow from the rail 6 so that the individual accumulator 7 is filled again at the beginning of the injection, i.e., the pressure in the individual accumulator 7 is again equal to the rail pressure pCR. The hydraulic resistance of the individual accumulator 7 and that of the feed line are coordinated with each other, i.e., the connecting line from the rail 6 to the individual accumulator 7 has a hydraulic resistance that is as high as possible. In a conventional common-rail system without individual accumulators, the hydraulic resistance between the rail 6 and the injector 8 should be as low as possible in order to realize unhindered injection.

The internal combustion engine I is automatically controlled by an electronic control unit (ADEC) 9. The electronic control unit 9 contains the usual components of a microcomputer system, for example, a microprocessor, interface adapters, buffers, and memory components (EEPROM, RAM). The relevant operating characteristics for the operation of the internal combustion engine 1 are applied in the memory components in input-output maps/characteristic curves. The electronic control unit 9 uses these to compute the output variables from the input variables. FIG. 1 shows the following input variables as examples: the rail pressure pCR, which is measured by means of a rail pressure sensor 10, a speed signal NMOT of the internal combustion engine 1, pressure signals pE of the individual accumulators 7, and an input variable IN. Examples of input variables IN are the signal of a knock sensor, the charge air pressure of a turbocharger, and the temperatures of the coolants/lubricants and of the fuel.

As output variables of the electronic control unit 9, FIG. 1 shows a signal PWM for controlling the suction throttle 4, a control signal S1 for activating the injector 8, typically the energization start BB and the energization duration BD, and an output variable OUT. The output variable OUT is representative of additional control signals for automatically controlling the internal combustion engine 1.

Figure 2:
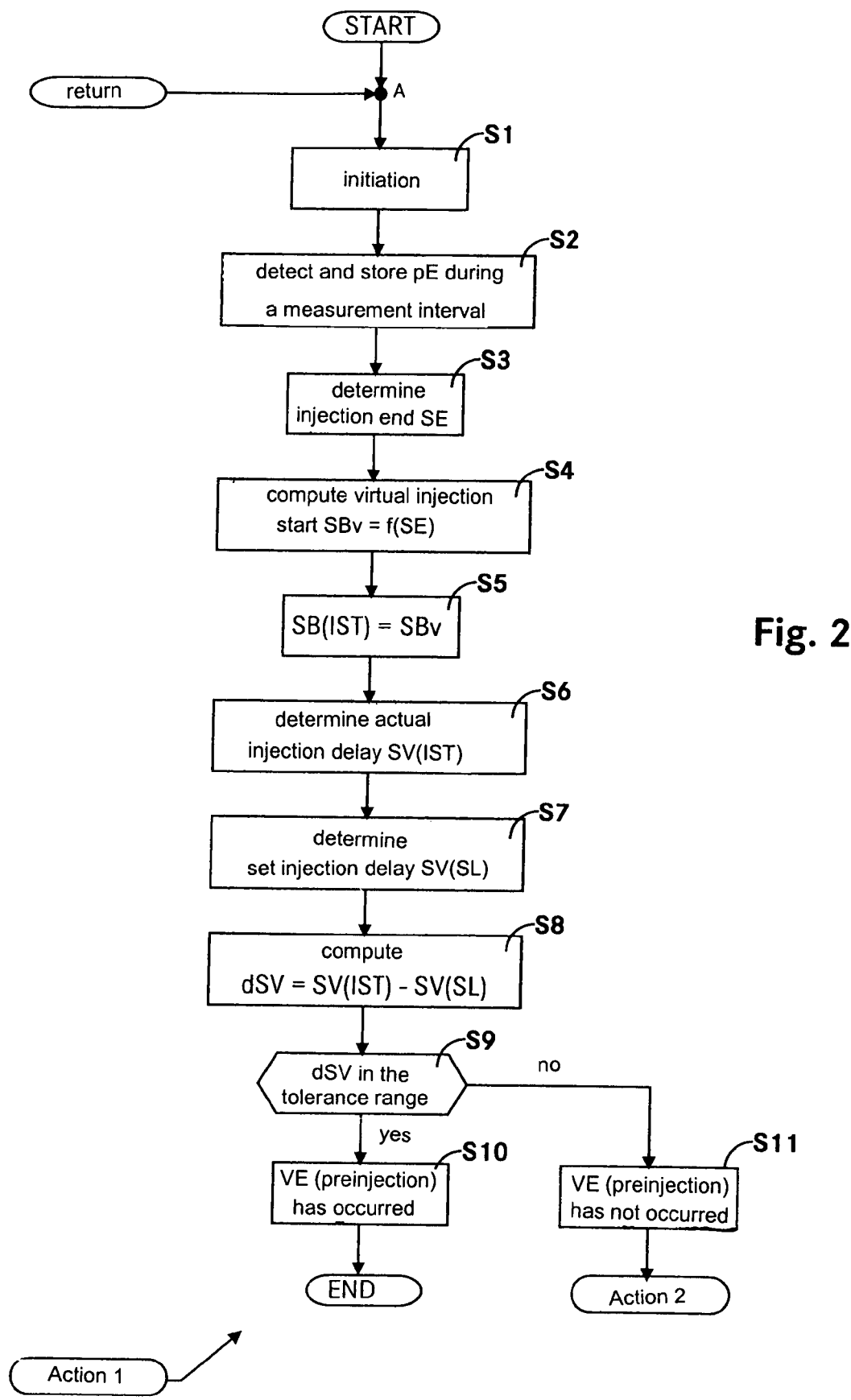
FIG. 2 shows a program flowchart of the first embodiment of the invention.

FIG. 2 shows a program flowchart of the first embodiment of the invention, in which the central element is the injection delay of the main injection. The injection delay is the time difference (lag time) from the output of the energization start to the injector by the electronic engine control unit to the actual injection start. At S1 an initiation occurs, i.e., a test to determine whether a preinjection has occurred. This program flow thus occurs with preinjection activated. The initiation can be either time-driven or event-driven, for example, if a knock sensor detects a significant pressure increase dp/dt in the cylinder. Following the initiation, the individual accumulator pressure distribution pE of a main injection is detected over a measurement interval and stored at S2. The measurement interval can correspond to one operating cycle of the internal combustion engine, i.e., 720° crankshaft angle. At S3 the injection end SE is determined from the measured individual accumulator pressure distribution pE. At S4 a virtual injection start SBv is computed from the injection end SE by a mathematical function, as disclosed in DE 103 44 181 A1. At S5 the virtual injection start SBv is set as the actual injection start SB(IST) for the further process. An actual injection delay SV(IST) of the main injection is then computed at S6. It is determined from the time difference from the output energization start of the main injection to the actual injection start SB(IST). At S7 a set injection delay SV(SL) is determined by an input-output map as a function of the rail pressure pCR and the motor speed NMOT. At S8 an injection delay deviation dSV is determined from the actual injection delay SV(IST) and the set injection delay SV(SL). At S9 a test is performed to determine whether the injection delay deviation dSV lies within a predetermined tolerance range.

Figure 4:
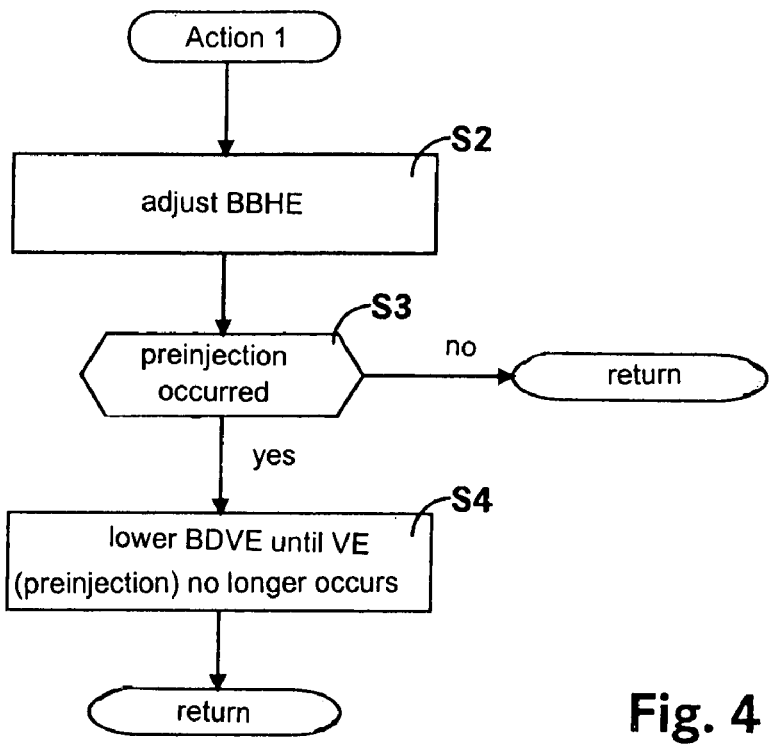
FIG. 4 shows a flowchart of a subroutine.
Figure 5:
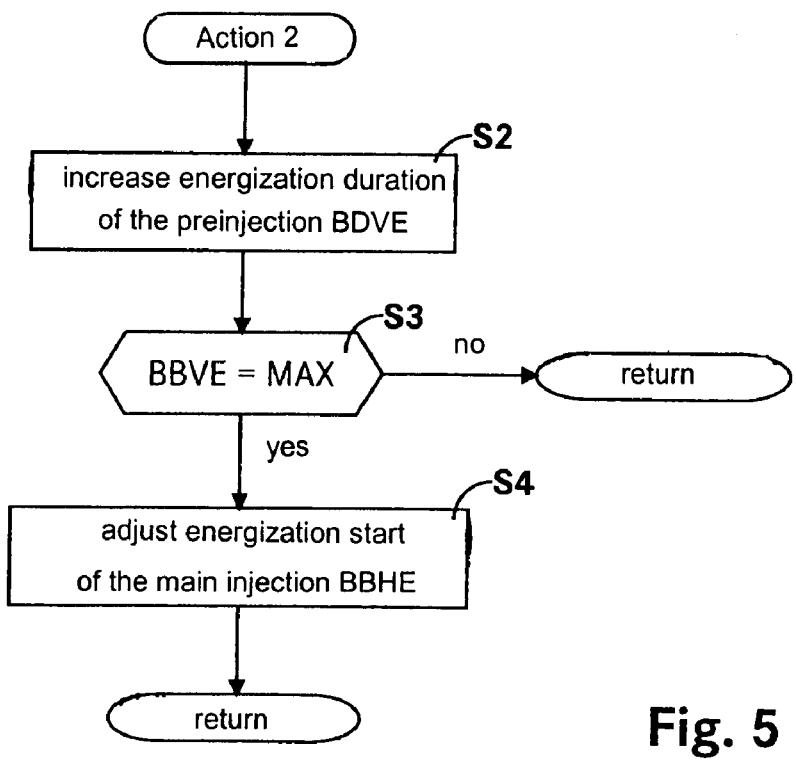
FIG. 5 shows a flowchart of a subroutine.

If the injection delay deviation dSV lies within the tolerance range (interrogation result S9: yes), a determination is made at S10 that a preinjection VE has occurred. This part of the program is thus ended. Alternatively, program control can pass to subroutine Action 1, which is shown in FIG. 4 and explained below with reference to FIG. 4. If the test at S9 reveals that the injection delay deviation dSV lies outside of the tolerance range (interrogation result S9: no), then a determination is made at S11 that a preinjection has not occurred. Program control then passes to subroutine Action 2, which is shown in FIG. 5 and explained below with reference to FIG. 5. This program flowchart is thus ended.

Figure 3:
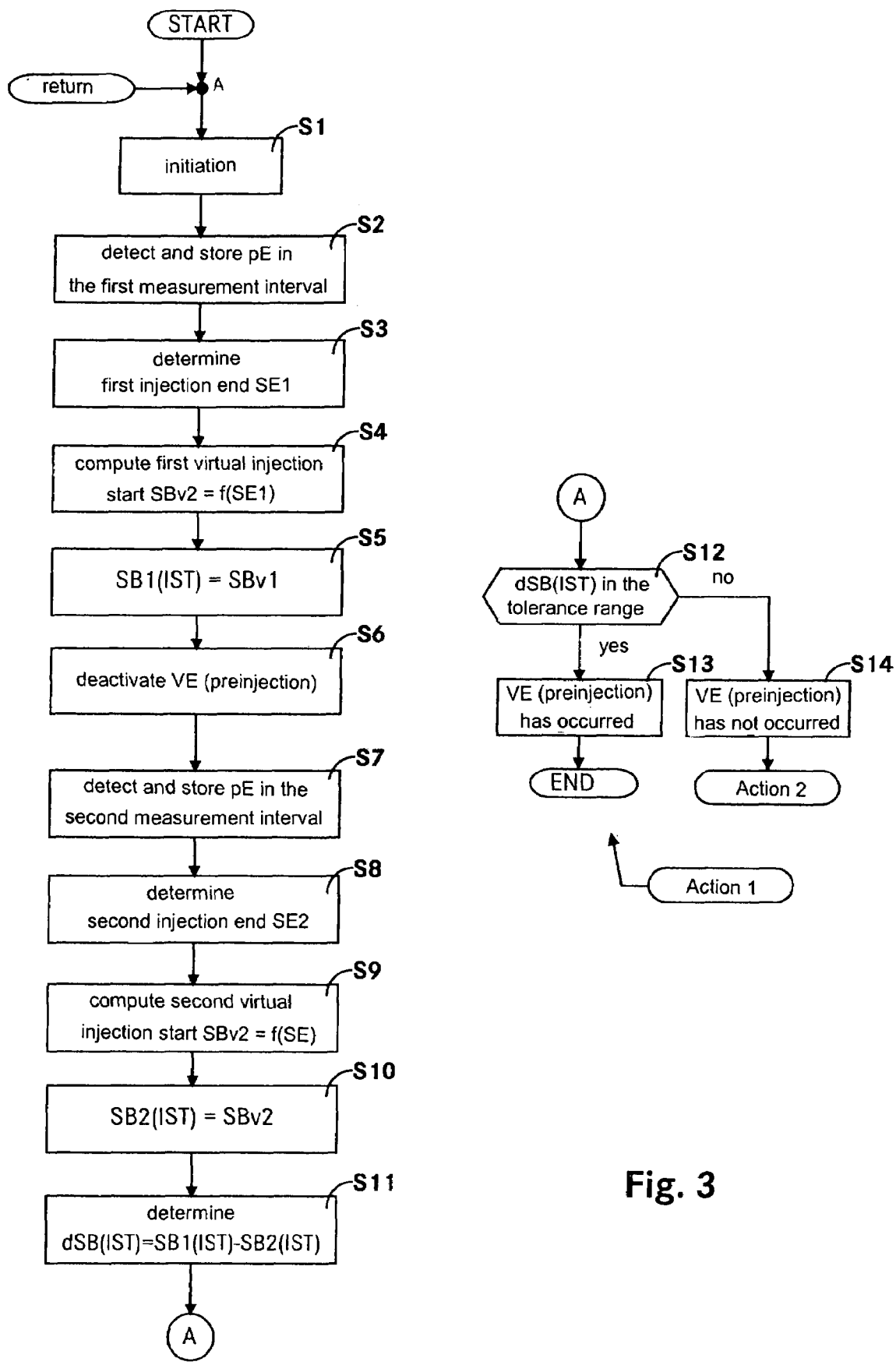
FIG. 3 shows a program flowchart of the second embodiment.

FIG. 3 shows a program flowchart of the second embodiment of the invention, in which the central element is the comparison of the injection start with preinjection with the injection start without preinjection. Steps S1 to S5 correspond in functional scope to steps S1 to S5 in FIG. 2. The initiation occurs at S1. At S2, with preinjection VE activated, the individual accumulator pressure distribution pE is detected in a first measurement interval and stored. At S3 the first injection end SE1 is determined. At S4 the first virtual injection start SBv1 is computed, and at S5 the first actual injection start SB1(IST) is set to the value of the first virtual injection start SBv1. At S6 the preinjection VE is then deactivated. At S7 the individual accumulator pressure distribution pE is detected in a second measurement interval and stored. It is then used at S8 to determine a second injection end SE2. At S9 a second virtual injection start SBv2 is computed. At S10 the second actual injection start SB2(IST) is then set to the value of the second virtual injection start SBv2. At S11 an actual injection start deviation dSB(IST) is then computed from the first actual injection start SB 1(IST) and the second actual injection start SB2(IST).

At S12 a test is performed to determine whether the actual injection start deviation dSB(IST) lies within a tolerance range. If this is the case (interrogation result S12: yes), a determination is made at S13 that a preinjection VE has occurred. This part of the program is thus ended. Alternatively, program control can also pass to subroutine Action 1

(see FIG. 4). If the test at S12 reveals that the actual injection start deviation dSB(IST) lies outside of the tolerance range (interrogation result S12: no), then a determination is made at S14 that a preinjection has not occurred. Program control then passes to subroutine Action 2 (see FIG. 5). This program flowchart is thus ended.

FIG. 4 shows the subroutine Action 1, which is always run when it has been determined that a preinjection VE has occurred. At S2 the energization start of the main injection BBHE is adjusted to a set value. At S3 a test is performed to determine whether a preinjection has occurred with the changed energization start in accordance with steps S2 to S11 of FIG. 2 or steps S2 to S14 of FIG. 3. If this is the case (interrogation result S3: yes), then at S4 the energization duration of the preinjection BDVE is lowered in increments until a preinjection VE no longer occurs at the following injection. Program control then passes back to point A of the main program (FIG. 2 or 3). If the test at S3 reveals that a preinjection VE has not occurred (interrogation result S3: no), then program control passes directly back to point A of the given main program.

FIG. 5 shows the subroutine Action 2, which is always run when it has been determined that a preinjection VE has not occurred. At S2 the energization duration of the preinjection BDVE is increased in increments until it has been determined that a preinjection occurs at the following injection. At S3 a limit interrogation is made for a maximum energization duration MAX. If the test at S3 shows that the maximum energization duration MAX of the preinjection VE has been reached without the occurrence of a preinjection VE (interrogation result S3: yes), then at S4 the energization start of the main injection BBHE is adjusted, and program control passes back to the given main program. If the test at S3 shows that the maximum energization duration MAX of the preinjection VE has not been reached (interrogation result S3: no), then program control passes back to point A of the given main program.

Although the present invention has been described in relation to particular embodiments thereof, many other variations and modifications and other uses will become apparent to those skilled in the art. It is preferred, therefore, that the present invention be limited but by the specific disclosure herein, but only by the appended claims.

The invention claimed is:

1. A method for detecting a preinjection in an internal combustion engine with a common-rail system, including individual accumulators, comprising the steps of: detecting an individual accumulator pressure distribution (pE) in a measurement interval and using the individual accumulator pressure distribution to determine an injection end (SE) of a main injection; computing a virtual injection start (SBv) of the main injection by a mathematical function as a function of the injection end (SE); setting the virtual injection start (SBv) as an actual injection start (SB(IST)) of the main injection; determining, with preinjection activated, an actual injection delay (SV(IST)) for the main injection as a function of the actual injection start (SB(IST)); computing an injection delay deviation (dSV) of a set injection delay (SV(SL)) from the actual injection delay (SV(IST)); and using the injection delay deviation (dSV) to determine whether a preinjection (VE) has occurred.

2. The method in accordance with claim 1, wherein a preinjection has occurred if the injection delay deviation (dSV) falls within a tolerance range (TB).

3. The method in accordance with claim 1, wherein a preinjection has not occurred if the injection delay deviation (dSV) falls outside a tolerance range (TB).

4. The method in accordance with claim 1, including computing the set injection delay (SV(SL)) by an input-output map as a function of a rail pressure (pCR) and an engine speed (nMOT).

5. A method for detecting a preinjection in an internal combustion engine with a common-rail system, including individual accumulators, comprising the steps of: detecting an individual accumulator pressure distribution (pE) in a first measurement interval and using the individual accumulator pressure distribution to determine a first injection end (SE1) of a main injection; computing a first virtual injection start (SBv1) of the main injection as a function of the first injection end (SE1) by means of a mathematical function; setting the first virtual injection start (SBv1) as a first actual injection start (SB1(IST)) of the main injection; deactivating the preinjection; detecting the individual accumulator pressure distribution (pE) in a second measurement interval and using the individual accumulator pressure distribution to determine a second injection end (SE2) of the main injection; computing a second virtual injection start (SBv2) of the main injection as a function of the second injection end (SE2) by means of a mathematical function; setting the second virtual injection start (SBv2) as a second actual injection start (SB2(IST)) of the main injection; computing an actual injection start deviation (dSB(IST)) from the first actual injection start (SB1(IST)) to the second actual injection start (SB2(IST)); and using the actual injection start deviation (dSB(IST)) to determine whether a preinjection (VE) has occurred.

6. The method in accordance with claim 5, wherein a preinjection has occurred if the actual injection start deviation (dSB(IST)) falls within a tolerance range (TB).

7. The method in accordance with claim 5, wherein a preinjection has not occurred if the actual injection start deviation (dSB(IST)) falls outside a tolerance range (TB).

8. The method in accordance with claim 3, including, when it has been detected that a preinjection has not occurred, increasing the energization duration of the preinjection (BDVE) in increments, starting from an initial value, until the occurrence of a preinjection is detected.

9. The method in accordance with claim 7, including, when it has been detected that a preinjection has not occurred, increasing the energization duration of the preinjection (BDVE) in increments, starting from an initial value, until the occurrence of a preinjection is detected.

10. The method in accordance with claim 8, wherein the energization duration of the preinjection (BDVE) is increased up to a maximum value (MAX), and when it is recognized that at the maximum value (MAX) a preinjection still has not occurred, the start of energization of the main injection (BBHE) is shifted towards late.

11. The method in accordance with claim 9, wherein the energization duration of the preinjection (BDVE) is increased up to a maximum value (MAX), and when it is recognized that at the maximum value (MAX) a preinjection still has not occurred, the start of energization of the main injection (BBHE) is shifted towards late.

12. The method in accordance with claim 2, including adjusting the energization start of the preinjection (BBHE) when occurrence of a preinjection has been detected.

13. The method in accordance with claim 6, including adjusting the energization start of the preinjection (BBHE) when occurrence of a preinjection has been detected.

* * * * *